United States Patent
Pan (10) Patent No.: US 7,440,342 B2
(45) Date of Patent: *Oct. 21, 2008

(54) UNIFIED VOLTAGE GENERATION METHOD WITH IMPROVED POWER EFFICIENCY

(75) Inventor: Feng Pan, Fremont, CA (US)

(73) Assignee: SanDisk Corporation, Milpitas, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 11/618,522

(22) Filed: Dec. 29, 2006

(65) Prior Publication Data

US 2008/0157859 A1 Jul. 3, 2008

(51) Int. Cl.
*G11C 5/14* (2006.01)

(52) U.S. Cl. .................... 365/189.09; 365/226; 327/538

(58) Field of Classification Search ............ 365/189.09, 365/222; 327/538
See application file for complete search history.

(56) References Cited

U.S. PATENT DOCUMENTS

| 5,508,971 | A | 4/1996 | Cernea et al. |
| 5,563,825 | A | 10/1996 | Cernea et al. |
| 5,568,424 | A | 10/1996 | Cernea et al. |
| 5,592,420 | A | 1/1997 | Cernea et al. |
| 5,621,685 | A | 4/1997 | Cernea et al. |
| 5,693,570 | A | 12/1997 | Cernea et al. |
| 6,134,145 | A | 10/2000 | Wong |
| 6,314,025 | B1 | 11/2001 | Wong |
| 6,329,869 | B1 | 12/2001 | Matano |
| 6,344,984 | B1 | 2/2002 | Miyazaki |
| 6,370,075 | B1 | 4/2002 | Haeberli et al. |
| 6,404,274 | B1 | 6/2002 | Hosono et al. |
| 6,486,728 | B2 | 11/2002 | Kleveland |
| 6,518,830 | B2 | 2/2003 | Gariboldi et al. |
| 6,525,949 | B1 | 2/2003 | Johnson et al. |
| 6,556,465 | B2 | 4/2003 | Haeberli et al. |
| 6,577,535 | B2 | 6/2003 | Pasternak |
| 6,606,267 | B2 | 8/2003 | Wong |
| 6,724,241 | B1 | 4/2004 | Bedarida et al. |
| 6,760,262 | B2 | 7/2004 | Haeberli et al. |
| 6,798,274 | B2 | 9/2004 | Tanimoto |
| 6,922,096 | B2 | 7/2005 | Cernea |
| 6,944,058 | B2 | 9/2005 | Wong |
| 6,990,031 | B2 * | 1/2006 | Hashimoto et al. .......... 365/222 |
| 7,023,260 | B2 | 4/2006 | Thorp et al. |
| 7,030,683 | B2 | 4/2006 | Pan et al. |
| 7,113,023 | B2 | 9/2006 | Cernea |
| 2005/0248386 | A1 | 11/2005 | Pan et al. |
| 2007/0126494 | A1 | 6/2007 | Pan |
| 2007/0139099 | A1 | 6/2007 | Pan |
| 2007/0139100 | A1 | 6/2007 | Pan |
| 2007/0229149 | A1 | 10/2007 | Pan et al. |
| 2008/0024096 | A1 | 1/2008 | Pan |

OTHER PUBLICATIONS

U.S. Appl. No. 11/618,539, entitled "Unified Voltage Generation apparatus with Improved Power Efficiency", filed Dec. 29, 2006.

(Continued)

*Primary Examiner*—Huan Hoang (57) ABSTRACT

Unified voltage generation techniques for efficiently generating a plurality of operational voltages for use within an electronic device, such as a memory system (e.g., memory product) providing data storage, are disclosed. A voltage generation circuit can generate a regulated base output voltage. The voltage generation circuit can include one or more voltage output circuits that produce different operational voltages from the regulated base output voltage. According to one aspect of the invention, the voltage output circuits can be disabled when the different operational voltages are at their appropriate voltage potentials, thereby reducing power consumption by the voltage output circuits. The voltage generation circuit is therefore able to operate with improved power efficiency.

19 Claims, 6 Drawing Sheets

OTHER PUBLICATIONS

Office Action for U.S. Appl. No. 11/618,539, mailed Mar. 25, 2008.
U.S. Appl. No. 11/694,798, entitled "Method for Load-based Voltage Generation", filed Mar. 30, 2007.
U.S. Appl. No. 11/694,760, entitled "Device with Load-Based Voltage Generation", filed Mar. 30, 2007.
U.S. Appl. No. 11/618,539, Office Action, mailed Mar. 25, 2008.

* cited by examiner

UNIFIED VOLTAGE GENERATION METHOD WITH IMPROVED POWER EFFICIENCY

CROSS-REFERENCE TO RELATED APPLICATION

This application is related to U.S. application Ser. No. 11/618,539, filed concurrently herewith, and entitled "UNIFIED VOLTAGE GENERATION APPARATUS WITH IMPROVED POWER EFFICIENCY," which is hereby incorporated herein by reference.

BACKGROUND OF THE INVENTION

1. Field of the Invention

The invention relates to voltage generation and, more particularly, to voltage generation internal to memory systems.

2. Description of the Related Art

Memory cards are commonly used to store digital data for use with various products (e.g., electronics products). Examples of memory cards are flash cards that use Flash type or EEPROM type memory cells to store the data. Flash cards have a relatively small form factor and have been used to store digital data for products such as cameras, hand-held computers, set-top boxes, hand-held or other small audio players/recorders (e.g., MP3 devices), and medical monitors. A major supplier of flash cards is SanDisk Corporation of Sunnyvale, Calif.

Figure 1:
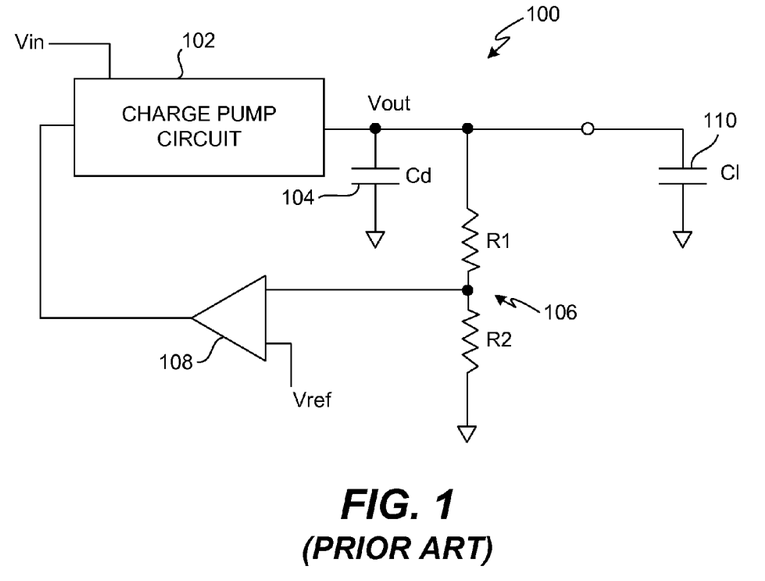
FIG. 1 is a schematic diagram of a conventional voltage generation circuit.

FIG. 1 is a schematic diagram of a conventional voltage generation circuit 100. The conventional voltage generation circuit 100 can provide one or more generated voltages to a memory system that provides non-volatile data storage and represents, for example, a memory card (e.g., flash card). The voltage generation circuit 100 includes a charge pump circuit 102. The charge pump circuit 102 operates to boost a lower input voltage ($V_{IN}$) to produce a higher output voltage ($V_{OUT}$). The output voltage is coupled to a decoupling capacitor ($C_D$) 104. The output voltage is also coupled to a resistor divider 106. The resistor divider 106 divides the output voltage using resistors $R_1$ and $R_2$. A comparator 108 couples to the resistor divider 106 and to a reference voltage ($V_{REF}$). The output of the comparator 108 is fed back to the charge pump circuit 102 so that the charge pump circuit 102 can regulate the output voltage so that it remains at a substantially constant voltage level.

In a unified voltage generation arrangement, a charge pump generates a high output voltage that is converted into different operational voltage levels for use by a memory system. Unfortunately, however, circuitry utilized to convert the high output voltage from a charge pump into the different operational voltage levels consumes a substantial amount of power. The power consumed by such circuitry is particularly problematic when being used with power conscious electronic devices, such as battery-powered electronic devices. Accordingly, there is a need for improved unified voltage generation circuits that can operate with improved power efficiency.

SUMMARY OF THE INVENTION

The invention relates to unified voltage generation techniques for efficiently generating a plurality of operational voltages for use within an electronic device, such as a memory system providing data storage. A voltage generation circuit can generate a regulated base output voltage. The voltage generation circuit can include one or more voltage output circuits that produce different operational voltages from the regulated base output voltage. According to one aspect of the invention, the voltage output circuits can be disabled when the different operational voltages are at their appropriate voltage potentials, thereby reducing power consumption by the voltage output circuits. The voltage generation circuit is therefore able to operate with improved power efficiency.

The voltage generation circuit is particularly well suited for use in a memory product. For example, the voltage generation circuit can be provided within a portable data storage device (e.g., memory card) to generate one or more internal voltages.

The invention can be implemented in numerous ways, including as a method, system, device or apparatus. Several embodiments of the invention are discussed below.

As a method for generating voltages for an electronic device, one embodiment of the invention includes at least: generating a regulated voltage; enabling generation of one or more reference voltages; generating one or more output voltages using the regulated voltage, each of the one or more output voltages being respectively dependent on one of the one or more reference voltages; outputting the one or more output voltages; subsequently disabling generation of the one or more reference voltages while still outputting the one or more output voltages; and thereafter re-enabling generation of the one or more reference voltages so the generating can refresh the one or more output voltages.

As a method for generating a plurality of voltages for an electronic device, one embodiment of the invention includes at least: generating first and second reference voltages; driving a first output voltage terminal to a first voltage, the first voltage being dependent on the first reference voltage; driving a second output voltage terminal to a second voltage, the second voltage being dependent on the second reference voltage; subsequently disabling generation of the first reference voltage; subsequently disabling generation of the second reference voltage; floating the first output voltage terminal in response to the disabling of generation of the first reference voltage; and floating the second output voltage terminal in response to the disabling of generation of the second reference voltage.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention relates to unified voltage generation techniques for efficiently generating a plurality of operational voltages for use within an electronic device, such as a memory system providing data storage. A voltage generation circuit can generate a regulated base output voltage. The voltage generation circuit can include one or more voltage output circuits that produce different operational voltages from the regulated base output voltage. According to one aspect of the invention, the voltage output circuits can be disabled when the different operational voltages are at their appropriate voltage potentials, thereby reducing power consumption by the voltage output circuits. The voltage generation circuit is therefore able to operate with improved power efficiency.

The voltage generation circuit is particularly well suited for use in a memory product. For example, the voltage generation circuit can be provided within a portable data storage device (e.g., memory card) to generate one or more internal voltages.

Embodiments of the invention are discussed below with reference to FIGS. 2-8. However, those skilled in the art will readily appreciate that the detailed description given herein with respect to these figures is for explanatory purposes as the invention extends beyond these limited embodiments.

Figure 2:
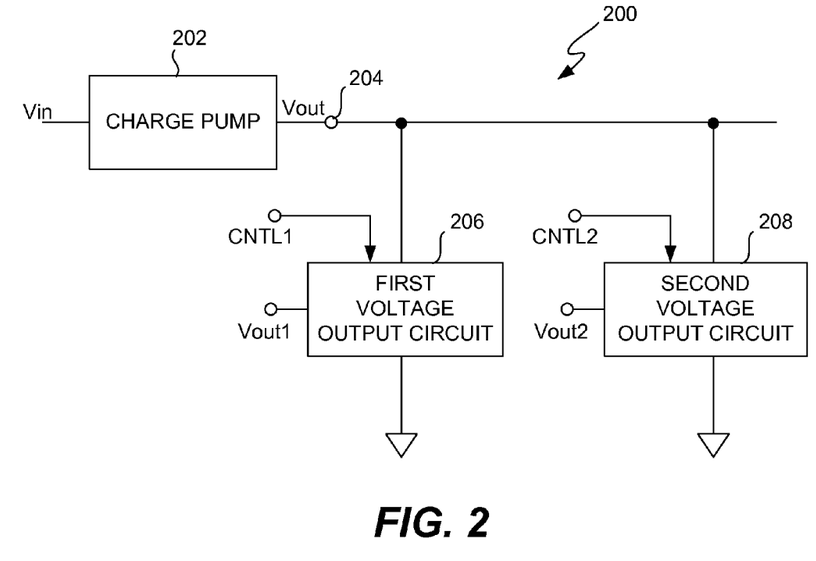
FIG. 2 is a block diagram of a voltage generation circuit according to one embodiment of the invention.

FIG. 2 is a block diagram of a voltage generation circuit 200 according to one embodiment of the invention. The voltage generation circuit 200 includes a charge pump 202. The charge pump 202 receives an input voltage (Vin) and produces an output voltage (Vout) at an output terminal 204. The output voltage (Vout) is at a higher voltage level than the input voltage (Vin) due to the charge pump 202 operating to boost the voltage level.

Typically, in data storage devices, such as FLASH memory or EEPROM devices, often a plurality of different voltage levels are used internally to support various operations (e.g., read, program and erase) and/or circuitry. According to the voltage generation circuit 200, the output voltage (Vout) provided at the output terminal 204 of the charge pump 202 is used to derive different output voltage levels to be used by the data storage devices. To generate the various different voltage levels, additional circuitry is utilized. In particular, a first voltage output circuit 206 is coupled to the output terminal 204. The first voltage output circuit 206 generates a first output voltage (Vout1). The first voltage output circuit 206 can be controlled by a control signal (CNTL1). The control signal (CNTL1) can operate to place the first voltage output circuit 206 in a low power state when the first output voltage (Vout1) has been stabilized to its appropriate level. Subsequently, as needed, the control signal (CNTL1) can reactivate the first voltage output circuit 206 to place the first voltage output circuit 206 in a normal power mode. Once back in the normal power mode, the first output voltage circuit 206 can cause the first output voltage (Vout1) to be re-stabilized at the appropriate level.

The voltage generation circuit 200 also includes a second voltage output circuit 208. The second voltage output circuit 208 produces a second output voltage (Vout2). The second voltage output circuit 208 is also controlled by a control signal (CNTL2). The control signal (CNTL2) can operate to place the second voltage output circuit 208 in a low power state when the second output voltage (Vout2) has been stabilized to its appropriate level. Subsequently, as needed, the control signal (CNTL2) can reactivate the second voltage output circuit 208 so as to place the second voltage output circuit 208 in a normal power mode. Once back in the normal power mode, the second output voltage circuit 208 can cause the second output voltage (Vout2) to be re-stabilized at the appropriate level.

Figure 3:
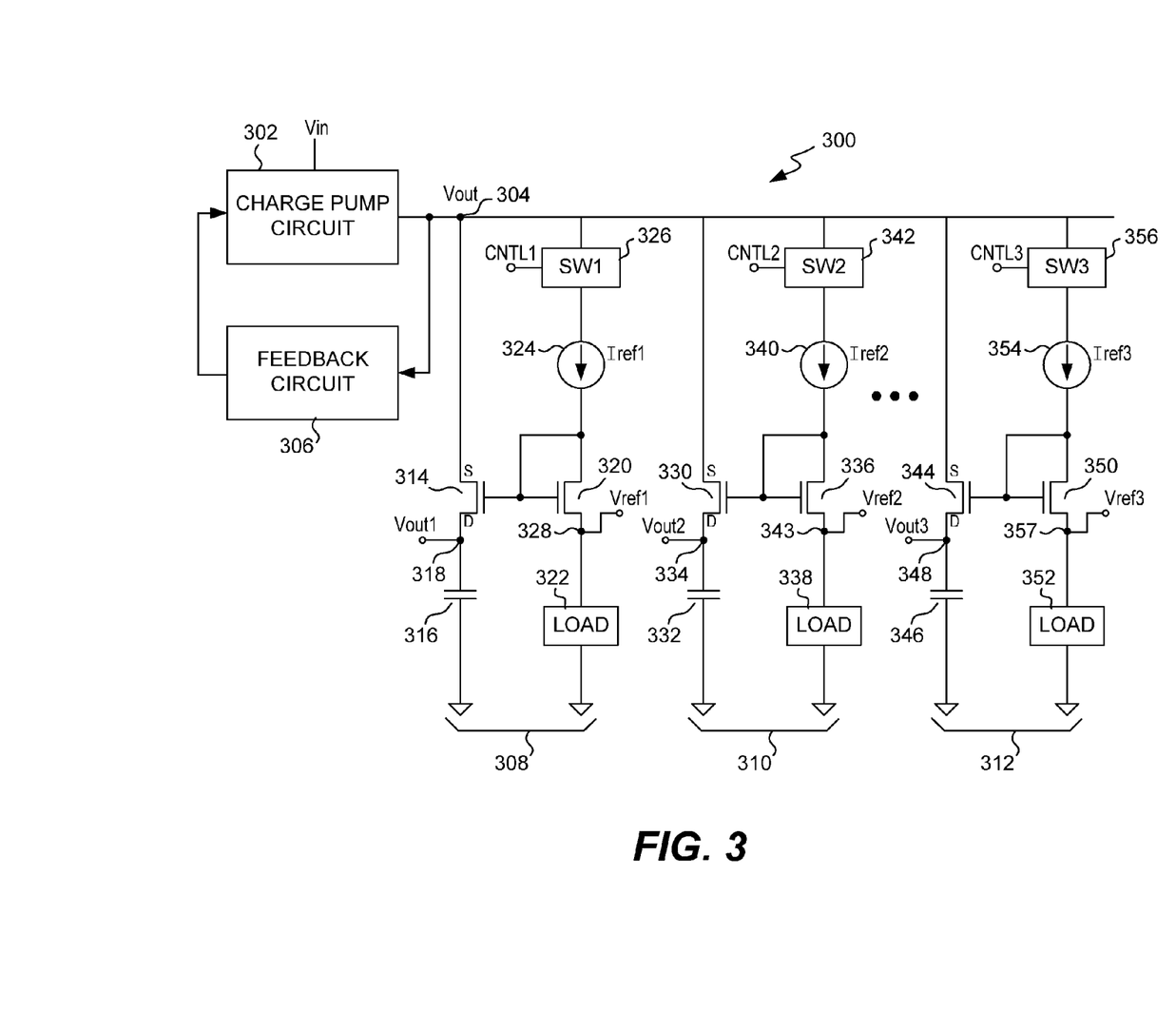
FIG. 3 is a schematic diagram of a voltage generation circuit according to one embodiment of the invention.

FIG. 3 is a schematic diagram of a voltage generation circuit 300 according to one embodiment of the invention. The voltage generation circuit 300 includes a charge pump circuit 302 that receives an input voltage (Vin) and outputs an output voltage (Vout) at an output terminal 304. In addition, a feedback circuit 306 can be coupled to the output terminal 304 so as to produce a feedback signal that is supplied to the charge pump circuit 302. The feedback circuit 306 assists the charge pump circuit 302 in stabilizing the output voltage (Vout) at the desired level. Since the voltage generation circuit 300 is utilized to produce a plurality of different voltage levels that are utilized by electronic circuitry (e.g., a data storage device), the voltage generation circuit 300 includes a first voltage output circuit 308, a second voltage output circuit 310, and a third voltage output circuit 312. However, in general, the voltage generation circuit 300 can include any number of voltage output circuits that are designed to produce particular output voltage levels to be utilized by the electronic circuitry. Namely, the first voltage output circuit 308 produces a first output voltage (Vout1), a second output voltage (Vout2), and a third output voltage (Vout3).

The first voltage output circuit 308 includes a first transistor 314 and a decoupling capacitor 316. The first transistor 314 is connected in series with the decoupling capacitor 316. The source terminal of the first transistor 314 is connected to the output terminal 304 and the drain terminal of the first transistor 314 is connected to a first output terminal 318. The decoupling capacitor 316 is coupled between the first output terminal 318 and ground. The first voltage output circuit 308 also includes a second transistor 320, an impedance load 322, a first reference current source 324 (Iref1), and a first switch 326 (SW1). The second transistor 320 has a gate terminal connected to a gate terminal of the first transistor 314. In addition, the gate terminal of the second transistor 320 is connected to the source terminal of the second transistor 320. A drain terminal of the second transistor 320 is connected to a first reference voltage node 328 (Vref1). The impedance load 322 is connected between the first reference voltage node 328 (Vref1) and ground. The impedance load 322 can vary with implementation. For example, the impedance load 322 can be a transistor (e.g., field-effect transistor (FET)), a diode, or a resistor. A first reference voltage is produced at the first reference voltage node 328 (Vref1) and such voltage is set at a level so as to produce the desired first output voltage (Vout1) at the first output terminal 318. The first switch 326 and the first reference current source 324 (Iref1) are connected in series between the output terminal 304 and the source terminal of the second transistor 320. More particularly, in the embodiment illustrated in FIG. 3, the first switch 326 is connected to the output terminal 304 and to the first reference current source 324 (Iref1). Under the control of a control signal (CNTL1), the first switch 326 (SW1) can either connect or disconnect the first reference current source 324 (Iref1) to the output terminal 304. The first reference current source 324 (Iref1) is also connected to the source terminal of the second transistor 320.

During operation, when the first switch 326 connects the first reference current source 324 (Iref1) to the output terminal 304, the first reference current (Iref1) is produced and supplied to the impedance load 322 via the second transistor 320. Further, the first output terminal 318 is driven to the first output voltage (Vout1) by charging the decoupling capacitor 316 via a current provided from the output terminal 304 via the first transistor 314. Thereafter, once the first output voltage has stabilized at the first output voltage (Vout1), the first switch 326 can disconnect the first reference current source 324 (Iref1) from the output terminal 304, which causes the first and second transistors 314 and 320 to turn-off. Consequently, the first output terminal 318 floats at the first output voltage (Vout1) so long as the charge stored on the capacitor 316 has not been significantly discharged. If charge stored on the capacitor 316 has discharged significantly due to leakage or otherwise, the first switch 326 can be again connected to drive the first output terminal 318 to the first output voltage (Vout1). Also when the first switch 326 disconnects the first reference current source 324 (Iref1) from the output terminal 304, the first reference current (Iref1) stops so that the DC power consumption by the impedance load 322 ceases.

Although FIG. 3 illustrated the first switch 326 as being connected to the output terminal 304, the first switch 326 could alternatively be connected to some other voltage potential. This other voltage potential can be dependent or independent of the regulated voltage on the output terminal 304.

The second voltage output circuit 310 includes a first transistor 330 and a decoupling capacitor 332. The first transistor 330 is connected in series with the decoupling capacitor 332. The source terminal of the first transistor 330 is connected to the output terminal 304 and the drain terminal of the first transistor 330 is connected to a second output terminal 334. The decoupling capacitor 332 is coupled between the second output terminal 334 and ground. The second voltage output circuit 310 also includes a second transistor 336, an impedance load 338, a second reference current source 340 (Iref2), and a second switch 342 (SW2). The second transistor 336 has a gate terminal connected to a gate terminal of the first transistor 330. In addition, the gate terminal of the second transistor 336 is connected to the source terminal of the second transistor 336. A drain terminal of the second transistor 336 is connected to a second reference voltage node 343 (Vref2). The impedance load 338 is connected between the second reference voltage node 343 (Vref2) and ground. The impedance load 338 can vary with implementation. For example, the impedance load 338 can be a transistor (e.g., field-effect transistor (FET)), a diode, and/or a resistor. A first reference voltage is produced at the second reference voltage node 343 (Vref2) and such voltage is set at a level so as to produce the desired second output voltage (Vout2) at the second output terminal 334. The second switch 342 and the second reference current source 340 (Iref2) are connected in series between the output terminal 304 and the source terminal of the second transistor 336. More particularly, in the embodiment illustrated in FIG. 3, the second switch 342 is connected to the output terminal 304 and to the second reference current source 340 (Iref2). Under the control of a control signal (CNTL2), the second switch 342 (SW2) can either connect or disconnect the second reference current source 340 (Iref2) to the output terminal 304. The second reference current source 340 (Iref2) is also connected to the source terminal of the second transistor 336.

During operation, when the second switch 342 connects the second reference current source 340 (Iref2) to the output terminal 304, the second reference current (Iref2) is produced and supplied to the impedance load 338 via the second transistor 336. Further, the second output terminal 334 is driven to the second output voltage (Vout2) by charging the decoupling capacitor 332 via a current provided from the output terminal 304 via the first transistor 330. Thereafter, once the second output voltage has stabilized at the second output voltage (Vout2), the second switch 342 can disconnect the second reference current source 340 (Iref2) from the output terminal 304, which causes the first and second transistors 330 and 336 to turn-off. Consequently, the second output terminal 334 floats at the second output voltage (Vout2) so long as the charge stored on the capacitor 332 has not been significantly discharged. If charge stored on the capacitor 332 has discharged significantly due to leakage or otherwise, the second switch 342 can again be connected to drive the second output terminal 334 to the second output voltage (Vout2). Also when the second switch 342 disconnects the second reference current source 340 (Iref2) from the output terminal 304, the second reference current (Iref2) stops so that the DC power consumption by the impedance load 338 ceases.

Although FIG. 3 illustrated the second switch 342 as being connected to the output terminal 304, the second switch 342 could alternatively be connected to some other voltage potential. This other voltage potential can be dependent or independent of the regulated voltage on the output terminal 304.

The third voltage output circuit 312 includes a first transistor 344 and a decoupling capacitor 346. The first transistor 344 is connected in series with the decoupling capacitor 346. The source terminal of the first transistor 344 is connected to the output terminal 304 and the drain terminal of the first transistor 344 is connected to a third output terminal 348. The decoupling capacitor 346 is coupled between the third output terminal 348 and ground. The third voltage output circuit 312 also includes a second transistor 350, an impedance load 352, a third reference current source 354 (Iref3), and a third switch 356 (SW3). The second transistor 350 has a gate terminal connected to a gate terminal of the first transistor 344. In addition, the gate terminal of the second transistor 350 is connected to the source terminal of the second transistor 350. A drain terminal of the second transistor 350 is connected to a third reference voltage node 357 (Vref3). The impedance load 352 is connected between the third reference voltage node 357 (Vref3) and ground. The impedance load 352 can vary with implementation. For example, the impedance load 352 can be a transistor (e.g., field-effect transistor (FET)), a diode, and/or a resistor. A third reference voltage is produced at the third reference voltage node 357 (Vref3) and such voltage is set at a level so as to produce the desired third output voltage (Vout3) at the third output terminal 348. The third switch 356 and the third reference current source 354 (Iref3) are connected in series between the output terminal 304 and the source terminal of the second transistor 350. More particularly, in the embodiment illustrated in FIG. 3, the third switch 356 is connected to the output terminal 304 and to the third reference current source 354 (Iref3). Under the control of a control signal (CNTL3), the third switch 356 (SW3) can either connect or disconnect the third reference current source 354 (Iref3) to the output terminal 304. The third reference current source 354 (Iref3) is also connected to the source terminal of the second transistor 350.

During operation, when the third switch 356 connects the third reference current source 354 (Iref3) to the output terminal 304, the third reference current (Iref3) is produced and supplied to the impedance load 352 via the second transistor 350. Further, the third output terminal 348 is driven to the third output voltage (Vout3) by charging the decoupling capacitor 346 via a current provided from the output terminal 304 via the first transistor 344. Thereafter, once the third output voltage has stabilized at the third output voltage (Vout3), the third switch 356 can disconnect the third reference current source 354 (Iref3) from the output terminal 304, which causes the first and second transistors 344 and 350 to turn-off. Consequently, the third output terminal 348 floats at the third output voltage (Vout3) so long as the charge stored on the capacitor 346 has not been significantly discharged. If charge stored on the capacitor 346 has discharged significantly due to leakage or otherwise, the third switch 356 can again be connected to drive the third output terminal 348 to the third output voltage (Vout3). Also when the third switch 356 disconnects the third reference current source 354 (Iref3) from the output terminal 304, the third reference current (Iref3) stops so that the DC power consumption by the impedance load 352 ceases.

Although FIG. 3 illustrated the third switch 356 as being connected to the output terminal 304, the third switch 356 could alternatively be connected to some other voltage potential. This other voltage potential can be dependent or independent of the regulated voltage on the output terminal 304.

Figure 4:
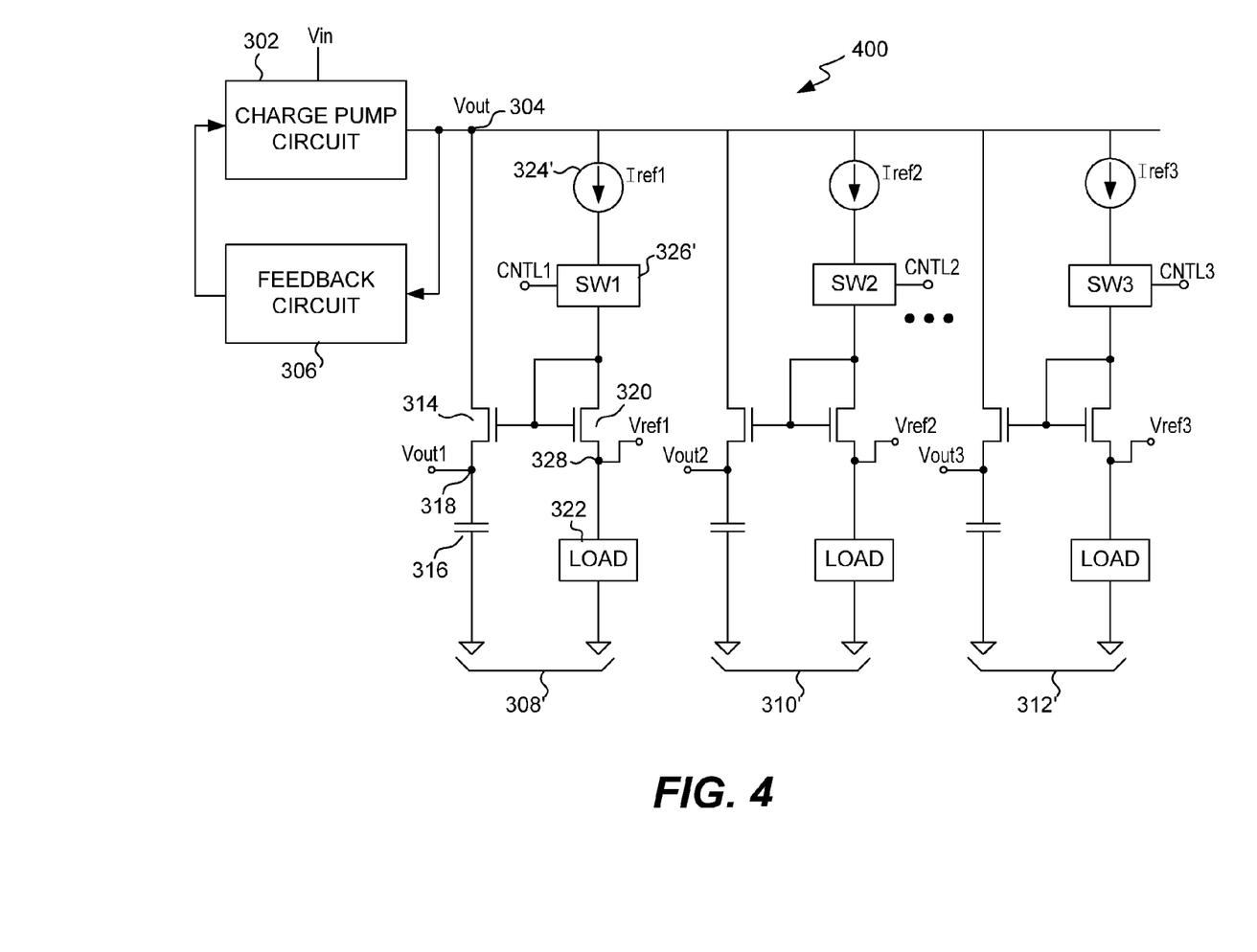
FIG. 4 is a schematic diagram of a voltage generation circuit according to another embodiment of the invention.

FIG. 4 is a schematic diagram of a voltage generation circuit 400 according to another embodiment of the invention. The voltage generation circuit 400 is substantially similar to the voltage generation circuit 300 illustrated in FIG. 3. However, the arrangement or configuration for the switches within the voltage output circuits 308, 310 and 312 are altered. In particular, in a voltage generation circuit 308' illustrated in FIG. 4, a first voltage reference current source 324' is coupled to a voltage source. In one embodiment, the voltage source is the output voltage (Vout) provided at the output terminal 304. A first switch 326' (SW1) is coupled between the first reference current source 324' (Iref1) and the second transistor 320. Otherwise, the first voltage output circuit 308' is the same as the first voltage output circuit 308 illustrated in FIG. 3. The second voltage output circuit 310' and the third voltage output circuit 312' are similarly respectively different from the second voltage output circuit 310 and the third voltage output circuit 312 illustrated in FIG. 3.

Figure 5:
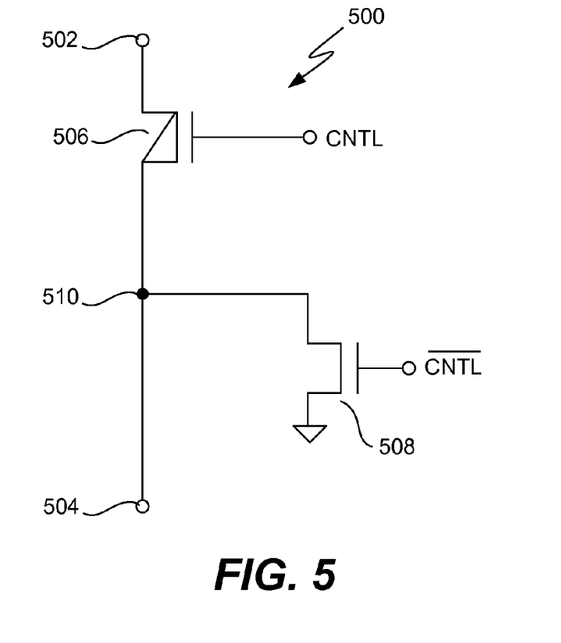
FIG. 5 is a schematic diagram of a switch according to one embodiment of the invention.

FIG. 5 is a schematic diagram of a switch 500 according to one embodiment of the invention. The switch 500 is, for example, suitable for use as the first switch 326, the second switch 342 or the third switch 356 illustrated in FIG. 3, or the first switch 326', the second switch 342' or the third switch 356' illustrated in FIG. 4.

The switch 500 includes a first terminal 502 that connects to a voltage source or to a reference current source depending upon implementation, and a second terminal 504 that connects to a transistor terminal or a reference current source depending upon implementation. The switch 500 includes a p-type transistor 506 (e.g., PMOS) connected between the first terminal 502 and the second terminal 504. The p-type transistor 506 is controlled by (CTRL) In addition, the switch 500 can include an n-type transistor 508 (e.g., NMOS). The n-type transistor 508 is connected between node 510 and ground and is controlled by a control signal (CNTL). Hence, the switch 500 can operate when the control signal (CNTL) is low to activate the p-type transistor 506 and to deactivate the n-type transistor 508 so that the first terminal 502 is effectively electrically connected to the second terminal 504. In this situation, the switch 500 is in effect "closed" so that the first terminal 502 is electrically connected to the second terminal 504. On the other hand, when the control signal (CNTL) is high, to deactivate the p-type transistor 506 and to activate the n-type transistor 508, the first terminal 502 is essentially electrically disconnected from the second terminal 504. In this situation, the switch is in effect "opened" so that the first terminal 502 is essentially electrically isolated from the second terminal 504. Additionally, when the control signal (CNTL) is high, the n-type transistor 508 can operate to pull down the voltage at the second terminal 504 to essentially ground potential.

Figure 6:
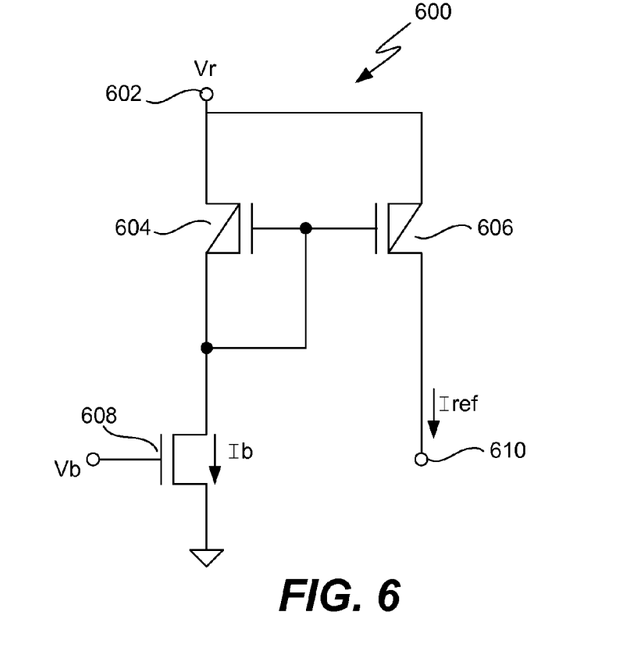
FIG. 6 is a schematic diagram of a current source according to one embodiment of the invention.

FIG. 6 is a schematic diagram of a current source 600 according to one embodiment of the invention. The current source 600 is, for example, suitable for use as the first reference current source 324, the second reference current source 340 or the third reference current 354 illustrated in FIG. 3, or the first reference current source 324', the second reference current source 340' or the third reference current source 354' illustrated in FIG. 4.

The current source 600 includes a first terminal 602. Typically, the first terminal 602 is coupled to a voltage level (Vb). The current source 600 includes a first p-type transistor 604 (e.g., PMOS) and a second p-type transistor 606 (e.g., NMOS). The first and second p-type transistors 604 and 606 are configured in a current mirror arrangement. In this regard, drain terminals of the p-type transistor 604 and 606 are connected to the first terminal 602. The gate terminals of the p-type transistors 604 and 606 are connected together. Also, the gate terminal of the first p-type transistor 604 is connected to the source terminal of the first p-type transistor 604. In addition, the current source 600 includes an n-type transistor 608 (e.g., NMOS). The n-type transistor 608 is coupled between the source terminal of the first p-type transistor 604 and ground. The n-type transistor 608 is biased by a voltage (Vb) supplied to the gate terminal of the n-type transistor 608. As a result of the biasing of the n-type transistor 608, a bias current (Ib) is established through the n-type transistor 608 to ground. As a result of the current mirror arrangement of the p-type transistors 604 and 606, a reference current (Iref) is established through the second p-type transistor 606 and output at a second terminal 610 of the current source 600.

Figure 7:
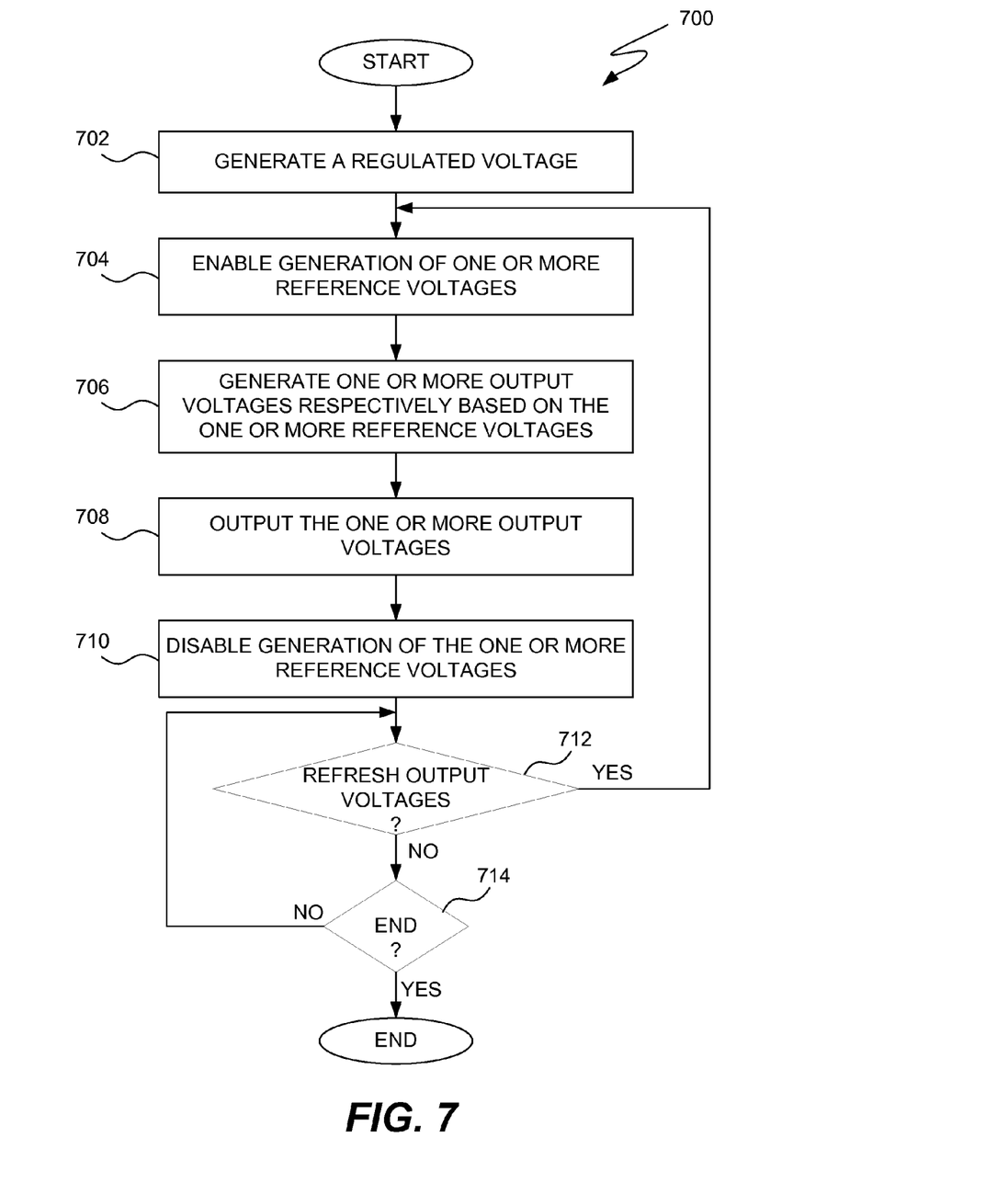
FIG. 7 is a flow diagram of a voltage generation process according to one embodiment of the invention.

FIG. 7 is a flow diagram of a voltage generation process 700 according to one embodiment of the invention. The voltage generation process 700 is, for example, performed by a voltage generation circuit, such as the voltage generation circuits discussed above with reference to FIGS. 2, 3 and 4.

The voltage generation process 700 can generate 702 a regulated voltage. For example, a charge pump circuit can be operated to generate a regulated output voltage. In addition, generation of one or more reference voltages can be enabled 704. The reference voltages are set to different voltage potentials that correspond to a plurality of output voltages to be produced by the voltage generation process 700. After the one or more reference voltages are enabled 704 to be generated, one or more output voltages are generated 706 respectively based on the one or more reference voltages.

Next, the one or more output voltages that have been generated 706 can be output 708. Thereafter, the generation of the one or more reference voltages can be disabled 710. Here, the one or more output voltages are output 708 in a stabilized manner because the one or more output voltages are generated 706 in accordance with the one or more reference voltages. In other words, the one or more output voltages are driven to predetermined levels that are determined based on the one or more reference voltages. Nevertheless, after the one or more output voltages are output 708, generation of the one or more reference voltages can be disabled 710. By disabling the one or more reference voltages, the circuitry and thus the power consumption (namely, DC power consumption) associated with the generation of the one or more reference voltages can be substantially reduced. Consequently, the power consumption to operate the circuitry that performs the voltage generation process 700 can be significantly reduced.

Next, a decision 712 determines whether the output voltages should be refreshed. Once the one or more output voltages have been output 708, the disablement of the one or more reference voltages operates to cause the one or more output voltages to float at their voltage level. Typically, the output voltages will be connected to loads and these loads will cause leakage or energy consumption and thus a reduction in the output voltage. However, it is generally assumed that the leakage or consumption imposed on the one or more output voltages will be relatively slow so that the output voltages can maintain their output potential for a reasonable amount of time. Nevertheless, the decision 712 determines whether one or more of the output voltages need to be refreshed. Accordingly, periodically, the output voltages will be determined to be in need of refreshment. In such case, the output voltage typically has dropped by a predetermined amount from the driven output voltage level. When this occurs, the voltage generation process 700 can return to repeat the block 704 so that the one or more reference voltages can again be enabled 704 and the one or more output voltages can be suitably generated 706. Alternatively, when the decision 712 determines that the output voltages did not need to be refreshed at this time, a decision 714 determines whether the voltage generation process 700 should end. When the decision 714 determines that the voltage generation process 700 should not end, the voltage generation process 700 returns to repeat the decision 712. On the other hand, when the decision 714 determines that the voltage generation process 700 should end, the voltage generation process 700 ends.

Figure 8:
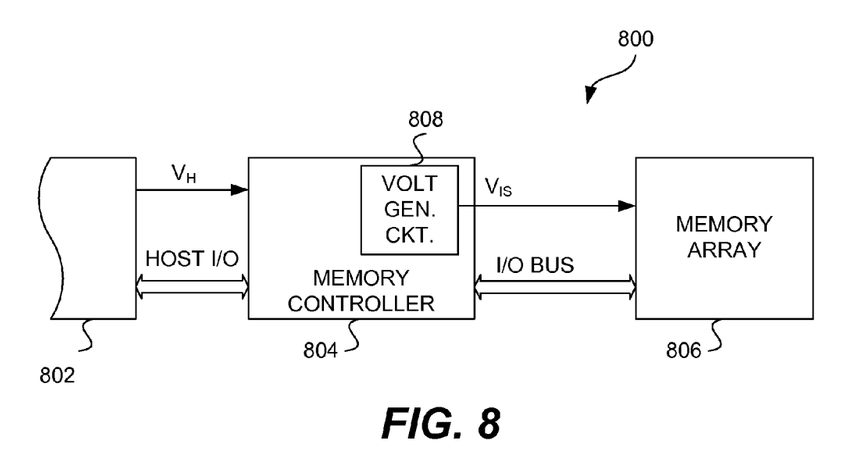
FIG. 8 is a block diagram of a memory system according to one embodiment of the invention.

FIG. 8 is a block diagram of a memory system 800 according to one embodiment of the invention. The memory system 800 is, for example, associated with a memory card (such as a plug-in card), a memory stick, or some other data storage product. Examples of a memory card include PC Card (formerly PCMCIA device), Flash Card, Flash Disk, Multimedia Card, and ATA Card. The memory system 800 can also be referred to as a memory product or a removable data storage product.

The memory system 800 cooperates with a host 802. For example, the host 802 can be a computing device, such as a personal computer. In particular, the memory system 800 stores data that can be utilized by the host 802. The memory system 800 and the host 802 can communicate over a host Input/Output (I/O) bus. The host 802 provides a host voltage ($V_H$) (i.e., supply voltage) to the memory system 800. The memory controller 804 couples to the host I/O bus and the host voltage ($V_H$). The memory controller 804 couples to a memory array 806 using an I/O bus and at least one internal supply voltage ($V_{IS}$). The at least one internal supply voltage ($V_{IS}$) is generated by a voltage generation circuit 808 provided within the memory controller 804. Although the embodiment of the memory system 800 shown in FIG. 8 produces the at least one internal supply voltage ($V_{IS}$) at the memory controller 804, it should be understood that the memory controller 804 can produce any number of a plurality of different supply voltage levels that would be needed by the memory array 806. The voltage generation circuit 808 can correspond to any of the voltage generation circuits discussed herein. For example, the voltage generation circuit 808 can correspond to the voltage generation circuits illustrated in FIG. 2, 3 or 4.

The level of the voltages can vary with implementation. As one example, the host voltage ($V_H$) might be 3.3 or 1.8 volts, and the level of the internal supply voltage ($V_{IS}$) might be 6.5 volts, 15 volts or 30 volts. Moreover, although the voltage generation circuit 808 is illustrated in FIG. 8 as being internal to the memory controller 804, in alternative embodiment, the voltage generation circuit 808 can be (i) internal to the memory array 806 or (ii) separate from either the memory controller 804 or the memory array 806.

The memory array 806 provides an array of data storage elements that provide non-volatile digital data storage. In one embodiment, the data storage elements are electrically programmable and electrically erasable, such as EEPROM or FLASH devices. For example, the data storage elements can be based on floating-gate devices. The memory array 806 can include one or more semiconductor dies, chips or products. The memory array 806 can include data storage elements. The memory controller 804 is also often a separate semiconductor die, chip or product.

The invention is suitable for use with both single-level (binary) memories and multi-level (multi-state) memories. In multi-level memories, each data storage element stores two or more bits of data.

As used herein "operatively connected" refers to direct or indirect electrical connection between electrical components.

The various features, aspects, embodiments or implementations can be used alone or in any combination.

The invention can pertain to a memory product that provides data storage. The memory product can, for example, pertain to a semiconductor memory product, such as a semiconductor memory chip or a portable memory card.

The invention can further pertain to an electronic system that includes a memory system as discussed above. A memory system is a system that includes at least a memory device that provides data storage. Memory systems (i.e., memory cards) are commonly used to store digital data for use with various electronics products. The memory system is often removable from the electronic system so the stored digital data is portable. The memory systems according to the invention can have a relatively small form factor and be used to store digital data for electronics products (e.g., consumer electronic products) that acquire data, such as cameras, hand-held or notebook computers, network cards, network appliances, set-top boxes, hand-held or other small media (e.g., audio) players/recorders (e.g., MP3 devices), personal digital assistants, mobile telephones, and medical monitors.

The invention is suitable for use with both single-level memories and multi-level memories. The memories or memory blocks are data storage devices that include data storage elements. The data storage elements can be based on semiconductor devices (e.g., floating-gate) or other types of devices. In multi-level memories, each data storage element stores two or more bits of data.

The advantages of the invention are numerous. Different embodiments or implementations may yield one or more of the following advantages. One advantage of the invention is that generation of one or more voltages can be provided in a power efficient manner. Another advantage of the invention is that low power, reliable, high performance memory systems can be obtained.

U.S. patent application Ser. No. 11/303,387, entitled "CHARGE PUMP REGULATION CONTROL FOR IMPROVED POWER EFFICIENCY", and filed Dec. 16, 2005, is hereby incorporated by reference herein.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for generating voltages for an electronic device, said method comprising:
   generating a regulated voltage;
   enabling generation of one or more reference voltages;
   generating one or more output voltages using the regulated voltage, each of the one or more output voltages being respectively dependent on one of the one or more reference voltages;
   outputting the one or more output voltages;
   subsequently disabling generation of the one or more reference voltages while still outputting the one or more output voltages; and
   thereafter re-enabling generation of the one or more reference voltages so said generating refreshes the one or more output voltages.

2. A method as recited in claim 1, wherein the one or more output voltages are not driven to one or more voltage potentials while said disabling has disabled generation of the one or more reference voltages.

3. A method as recited in claim 1, wherein the one or more output voltages are floating while said disabling has disabled generation of the one or more reference voltages.

4. A method as recited in claim 1, wherein while generation of the one or more reference voltages are disabled, power consumption by the associated circuitry is substantially reduced.

5. A memory product as recited in claim 1, wherein the electronic device is a portable and removable data storage product.

6. A method as recited in claim 1, wherein said enabling generation of one or more reference voltages comprises:
   producing one or more reference currents; and
   generating the one or more reference voltages by supplying the one or more reference currents to one or more impedance loads, respectively.

7. A method as recited in claim 6, wherein the one or more output voltages are floating while said disabling has disabled generation of the one or more reference voltages.

8. A method as recited in claim 6, wherein while generation of the one or more reference voltages are disabled, power consumption by the associated circuitry is substantially reduced.

9. A memory product as recited in claim 6, wherein the electronic device is a portable and removable data storage product.

10. A method for generating a plurality of voltages for an electronic device, said method comprising:
    generating first and second reference voltages;
    driving a first output voltage terminal to a first voltage, the first voltage being dependent on the first reference voltage;
    driving a second output voltage terminal to a second voltage, the second voltage being dependent on the second reference voltage;
    subsequently disabling generation of the first reference voltage;
    subsequently disabling generation of the second reference voltage;
    floating the first output voltage terminal in response to said disabling of generation of the first reference voltage; and
    floating the second output voltage terminal in response to said disabling of generation of the second reference voltage.

11. A method as recited in claim 10, wherein said method further comprises:
    re-enabling, subsequent to said floating of the first output voltage terminal, generation of the first reference voltage so that said driving drives the first output voltage terminal to the first voltage; and
    re-enabling, subsequent to said floating of the second output voltage terminal, generation of the second reference voltage so that said driving drives the second output voltage terminal to the second voltage.

12. A method as recited in claim 11, wherein said disabling generation of the first reference voltage causes the first reference voltage to be output from the first output voltage terminal in a low power manner.

13. A method as recited in claim 12, wherein said disabling generation of the second reference voltage causes the second reference voltage to be output from the second output voltage terminal in a low power manner.

14. A method as recited in claim 13, wherein the electronic device is a portable and removable data storage product.

15. A method as recited in claim 10,
    wherein the first output voltage terminal is floating when the generation of the first reference voltage is disabled, and
    wherein the second output voltage terminal is floating when the generation of the second reference voltage is disabled.

16. A method as recited in claim 10, wherein the electronic device is a portable and removable data storage product.

17. A method as recited in claim 10, wherein said disabling generation of the first reference voltage causes the first reference voltage to be output from the first output voltage terminal in a low power manner.

18. A method as recited in claim 17, wherein said disabling generation of the second reference voltage causes the second reference voltage to be output from the second output voltage terminal in a low power manner.

19. A method as recited in claim 18, wherein the electronic device is a portable and removable data storage product.

* * * * *